United States Patent [19]

Bourgault et al.

[11] Patent Number: 4,655,296

[45] Date of Patent: Apr. 7, 1987

[54] FARMING IMPLEMENT WITH WHEEL DEPTH CONTROL

[75] Inventors: Francois P. Bourgault; Joseph L. Bourgault, both of Saskatchewan, Canada

[73] Assignee: F. P. Bourgault Industries, Ltd., Saskatchewan, Canada

[21] Appl. No.: 765,946

[22] Filed: Aug. 15, 1985

[30] Foreign Application Priority Data

Feb. 15, 1985 [CA] Canada .................................. 474394

[51] Int. Cl.⁴ .......................................... A01B 63/22
[52] U.S. Cl. ..................... 172/400; 172/413; 172/417; 280/43.13; 280/43.23
[58] Field of Search ............... 172/248, 310, 311, 400, 172/401, 413, 417, 421, 625; 280/43.13, 43.23

[56] References Cited

U.S. PATENT DOCUMENTS

| | | | |
|---|---|---|---|
| 2,682,153 | 6/1954 | Fink, Sr. .................. | 280/43.23 X |
| 2,828,680 | 5/1955 | Johnson ................... | 172/310 |
| 3,091,476 | 5/1963 | Blake ...................... | 280/43.13 |
| 3,223,179 | 3/1964 | Mackenzie ................ | 172/310 X |
| 3,487,882 | 11/1967 | Burton ................... | 172/310 |
| 3,539,197 | 11/1970 | Remaud et al. ............ | 280/104 |
| 3,777,823 | 12/1973 | Holfeld .................. | 172/328 |
| 3,870,107 | 3/1975 | Orthman ................. | 172/413 |
| 4,083,411 | 4/1978 | van der Lely ............ | 172/248 X |
| 4,139,065 | 2/1979 | Lewison ................. | 172/400 |
| 4,317,489 | 3/1982 | Steinbach ............... | 172/400 |
| 4,387,772 | 6/1983 | Bourgault ............... | 172/311 |

FOREIGN PATENT DOCUMENTS

| | | |
|---|---|---|
| 188295 | 1/1919 | Canada . |
| 550521 | 12/1957 | Canada . |
| 614622 | 2/1961 | Canada .................. 280/43.23 |
| 727392 | 2/1966 | Canada . |
| 728925 | 3/1966 | Canada . |
| 803220 | 1/1969 | Canada . |
| 1113768 | 8/1981 | Canada . |
| 403957 | 5/1943 | Italy .................... 280/43.13 |

*Primary Examiner*—Richard T. Stouffer
*Attorney, Agent, or Firm*—Laubscher & Laubscher

[57] ABSTRACT

A farming implement is disclosed having a series of wheel subassemblies supporting a towed frame. Each subassembly has a front wheel, preferably a castor wheel, and a rear wheel arrangement. According to the invention, the rear wheel arrangement is secured to a trailing arm which is connected by a connecting rod with a front arm. The connecting rod, the pivot point of the rear and the front arms and the point at which the rear and the front wheels are secured to the respective arms form, in the preferred embodiment, identical right-angled triangles. The rear arm is operatively associated with a hydraulic cylinder for raising or lifting the trailing arm as the need arises. The movement of the trailing arm is transmitted through the linkage to the front wheel whereby the frame of the implement is maintained at a generally horizontal position at all times. The front and rear arms holding the respective wheels are interconnected with a connecting rod the length of which is selectively adjustable to compensate for any deviations from the horizontal level in the front-back direction. The compensation in the sideways direction is taken care of by an adjustable mount of the hydraulic cylinders actuating the respective trailing arms.

3 Claims, 4 Drawing Figures

FARMING IMPLEMENT WITH WHEEL DEPTH CONTROL

BACKGROUND OF THE INVENTION

The present invention relates to an earth working device and in particular to a farming implement such as a cultivator or the like.

More specifically, the invention is directed to an improvement in the system of controlling the depth of penetration of earth by working tools on a farming implement. The invention is explained with reference to an agricultural tillage implement such as a cultivator, it being understood that the invention can be used with any other farming implement in which the control of the level or depth of penetration of the earth working tools is of essence.

BRIEF DESCRIPTION OF THE PRIOR ART

Many agricultural implements of the type including tilling shovels are known from prior art.

They are usually towed by a tractor and can be divided into two basic groups from the standpoint of the way of securement to a tractor. In particular, the first group is more or less fixedly secured to the tractor such that when the tractor itself reaches an elevated level, the whole implement follows the inclination thus induced. The second group of the towed implements of this type utilizes so-called "floating hitch". In other words, the front of the frame of such as implement is provided with a pivotal or hinged securement of the towing bar whose opposite end is then secured to the tractor. The latter arrangement is typical by having a number of wheel subassemblies which include a set of front wheels and a set of rear wheels. The advantage of the "floating hitch" is in that the implement more closely follows all irregularities of the surface of a field and thus provides a more uniform depth of the tools.

It is one of the pre-requisites of farming implements of this type that they be not only capable of becoming readily convertible from a transportation position at which the earth working tools are lifted substantially above the ground, and a second position in which the frame of the implement with the tools is lowered such that the tools penetrate the soil to a predetermined depth. Finally, it is also very important to assure that the operator of the tractor can readily adjust the depth of penetration of the soil by the earth working tools secured to the frame of the apparatus, during the operation.

A vast number of different ways of controlling the depth of penetration by the tools are known from prior art. They operate on hydraulic, mechanical or combined principles and utilize many different ways of obtaining as level an arrangement as possible. It is important not only to achieve proper maintaining of the frame of the implement at a horizontal level (thus securing uniform depth of penetration by the working tools), but also to secure that the horizontal, levelled arrangement is retained both longitudinally and transversely of the implement.

As regards prior art, reference may be had to the following patents utilizing the system of a floating hinge: U.S. Pat. No 4,083,411 (van der Lely), Canadian Patent No. 803,220 (Sokolik), and Canadian Patent No. 727,392 (Telecky).

In Canadian Patent No. 727,392, a triangular frame is provided with front and rear wheels. The lifting is achieved by an additional or supplementary frame, referred to as "lift frame" which is raised or lowered according to the instant need of the type of working the soil. The arrangement is disadvantageous since it does not allow for convenient levelling of the device in case of a front-rear misalignment or in case of a sideways misalignment. Besides, adjustments of the level are very cumbersome to be carried out. The same disadvantages are basically encountered in the Sokolik device which also utilizes what amounts in effect to a sub-frame lifted or lowered by a hydraulic arrangement as the need arises. In the van der Lely U.S. Pat. No. 4,083,411, the depth of penetration is in fact controlled by a pilot wheel contacting the ground. A separate hydraulic mechanism is utilized for lifting and lowering the frame of the device from a transport position to an earth working position. Again, the levelling of the frame transversely and longitudinally is cumbersome.

It is an object of the present invention to provide an arrangement for a farming implement, whereby the levelling of the frame both longitudinally and transversely can be effected very conveniently by levelling the entire frame holding the earth working tools, while utilizing reliable and structurally simple means for such operation.

SUMMARY OF THE INVENTION

In general terms, the present invention provides a farming implement of the type including a frame section carrying a plurality of earth working tools and provided with ground wheel means secured to the frame section for allowing movement of same in a predetermined direction; towing bar means secured to said frame section at a front end thereof for a free pivotal movement about a generally horizontal, transverse axis, said ground wheel means being comprised of a plurality of ground wheel subassemblies, each ground wheel subassembly comprising, in combination, a castor wheel at the front of the frame section, said castor wheel being secured to a forward end of a longitudinal front suspension arm at a forward end point thereof, the rear end of the front suspension arm being pivotable about a first pivot point formed by a first bearing means fixedly secured to the frame section and having a generally horizontal, transverse axis, rear wheel means secured to a back end of a longitudinal rear suspension arm at a back end pivot thereof, the forward end of the rear suspension arm being pivotable about a generally horizontal transverse axis in a second bearing means fixedly secured to the frame section, hydraulic cylinder drive means having one end pivotally secured to the frame section, the other end being pivotably secured to the rear suspension arm to selectively raise or lower same by pivoting it in said second bearing means, a front bracket fixedly secured to the front suspension arm and depending downwardly and rearwards therefrom to form at a free end thereof a forward pivot joint for a connecting rod, said forward pivot joint being disposed below that of the first bearing means, a rear bracket fixedly arranged on the rear suspension arm and extending upwardly and forwards therefrom to form at a free end thereof a rear pivotal joint for the connecting rod, said rear pivotal joint being disposed at a level above that of the second bearing means, the connecting rod having a rear end pivotably secured to the rear pivot joint and a front end pivotably secured to the front pivot joint for transmitting the pivotal movement of the rear suspension arm to the front suspension arm such that the lowering of the back end of the rear suspension arm results in the lowering of the forward end of the front suspension arm relative to the frame and vice-versa.

In a preferred embodiment, the ground wheel subassembly is so arranged and dimensioned that, when viewed in a side view, the said second bearing means, the said back end point and the said rear pivotal joint form a first right-angled triangle which is similar and preferably identical to a second right-angled triangle defined by the said first bearing means, the forward end point and the forward pivot joint.

BRIEF DESCRIPTION OF THE FIGURES

The invention will now be described by way of a preferred embodiment with reference to the accompanying drawings wherein.

DETAILED DESCRIPTION

Figure 1:
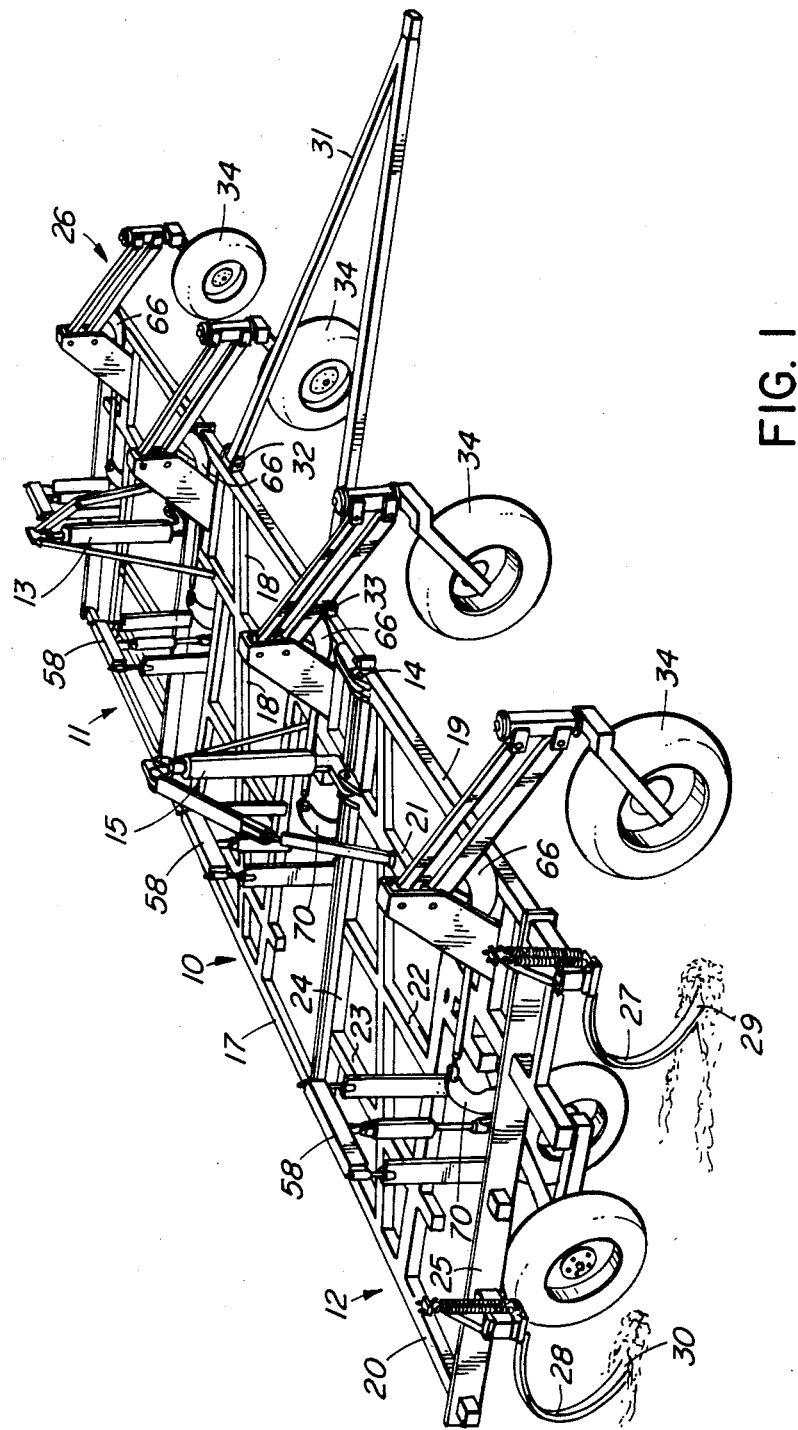
FIG. 1 is a simplified, diagrammatic perspective view of a farming implement utilizing the present invention.

Turning firstly to the representation of FIG. 1, reference numeral 10 denotes a main frame disposed centrally of the implement and operatively associated with a left-hand side frame 11 and a right-hand side frame 12. The frame 11 is hingedly secured to the frame 10 for pivotal movement about a longitudinal axis, when the frame is to be transported on a highway or the like, in order to reduce the width at the left-hand side. The folding of the frame is effected by a hydraulic cylinder 13 arranged to lift the frame 11 to approximately an upright position and over the top of the central main frame 10. Similarly, the right-hand side frame 12 is hinged at 14 to the frame 10 for a folding which is normally effected by actuating a hydraulic cylinder 15. The folding of the side frames 11 and 12 is very well known in the art and does not in fact form a part of the present invention.

The main frame 10 includes a front transverse beam 16, a rear transverse beam 17 and appropriate number of reinforcement cross members such as cross member 18. Similarly, the right-hand side frame 12 includes a front transverse beam 19, a rear transverse beam 20 and a series of transverse beam members 21, 22 and 23, as well as longitudinal beam 24 at the hinge 14 and an outer longitudinal beam 25.

It is to be noted at this point that the frame 11 at the left-hand side is identical to a mirror image of the frame 12 at the left-hand side. For the purpose of the present invention it is important to notice that in the fully unfolded state shown in FIG. 1, the frames 10, 11 and 12 form a rigid, singular "frame section" 10, 11, 12 carrying a plurality of earth working tools.

For the sake of simplicity, only two such earth working tools are shown, both of them secured to the right-hand side frame 12 it being understood that a large number of such tools is normally used in the implement in a number of transverse rows, from the right-hand side extreme at beam 19 of FIG. 1 to the left-hand side extreme thereof, beyond the extreme left-hand side wheel subassembly referred to with reference numeral 26. In the shown embodiment, the earth working tools are cultivator hoes 27, 28 the free ends or tips 29, 30 of which face forwards to penetrate earth at a predetermined depth, depending on the instant level of the frame section 10, 11, 12 relative to the ground. The subassembly 26 can also be referred to as being one of ground wheel means. The ground wheel means 26 is identical in its arrangement with the remaining three ground wheel means, of which two are operatively associated with the main frame 10, while one of each of the ground wheel means is associated with the left hand and right-hand side frame 11, 12, respectively. The ground wheel means, of course, allow the frame section 10, 11, 12 to be towed by a tractor at a tow bar 31 secured to the frame section 10, 11 and 12 by way of securement to the section 10 at the front beam 16 thereof, for a "floating" pivotal movement about a transverse horizontal axis of the two coaxial hinges 32, 33.

As mentioned above, the embodiment in FIG. 1 has a total of four wheel subassemblies it being understood that any number in excess of two wheel subassemblies can be utilized in accordance with the present invention, depending on the size of the implement.

Figure 2:
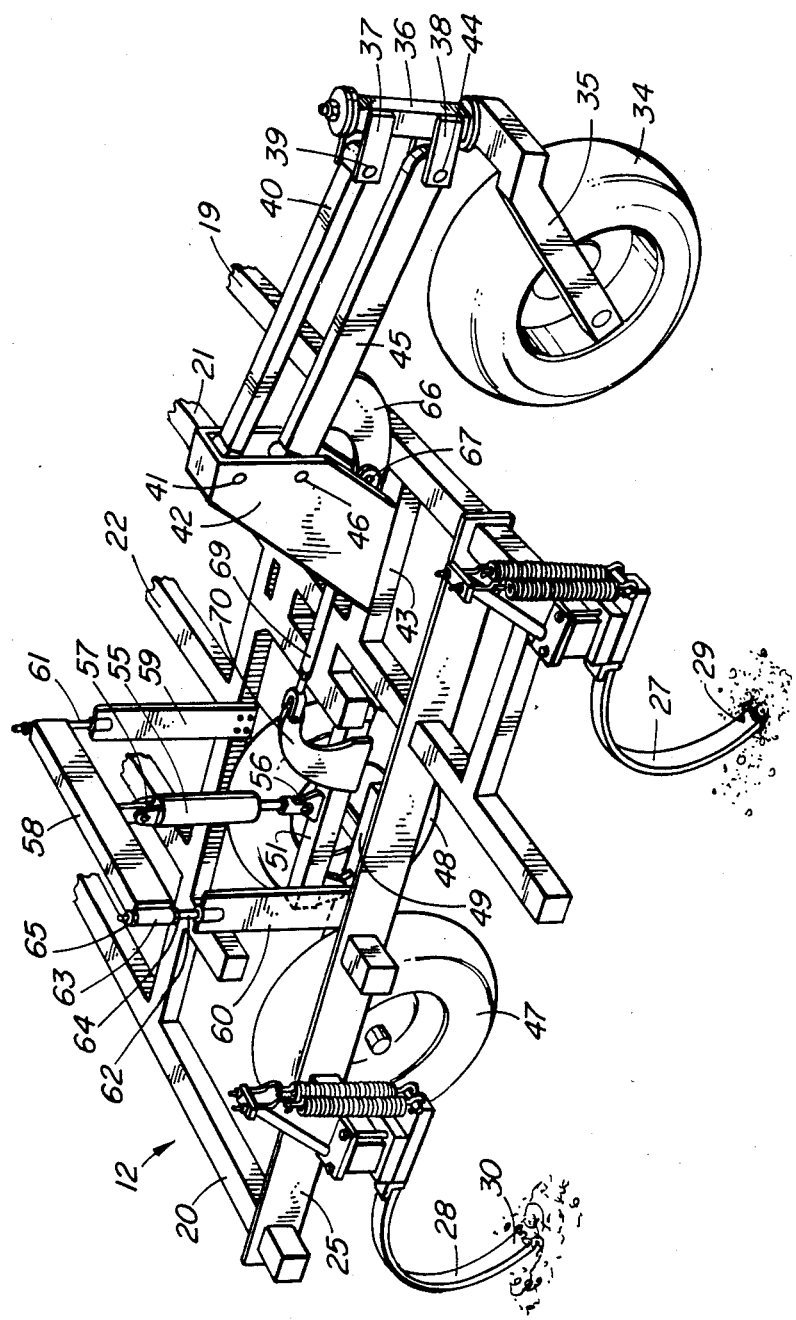
FIG. 2 is a simplified, diagrammatic partial view of what is shown in FIG. 1 but showing the arrangement of the forwardmost subassembly as viewed in FIG. 1.

The present invention is mainly concerned with the wheel subassembly and in particular with means for raising and lowering the frame section 10, 11, 12 by operating the wheel subassembly. Reference will now be had to FIG. 2 which shows the wheel subassembly of the right-hand side frame 12. The wheel subassembly comprises a front wheel 34 which is mounted, by way of a fork element 35 to an upright journal housing 36, for pivotal movement about a vertical axis of elongation of the journal housing 36. The wheel 34 is thus operative as a castor wheel at the front of the frame section 12. Turning briefly back to the representation of FIG. 1, it will be seen that a series of such castor wheels 34 is provided, one for each of the subassemblies as referred to above.

The journal housing 36 is provided with a pair of brackets 37, 38. A journal 39 connects the upper bracket 37 to a parallelogram link 40, whose opposite end is secured, by a pivot pin 41, to a mounting bracket 42 which is hollow and is fixedly secured, by welding, to a frame member 43 of the frame 12.

Similarly, the bracket 38 is secured, by a pivot pin 44 to a forward end of a longitudinal front suspension arm 45 at a forward end point thereof. The forward end point is identical with the pivot pin 44. The rear end of the arm 45, in turn, is secured by a pivot pin 46 to the mounting bracket 42. Since, for all practical purposes, the mounting bracket 42 forms an integral part of the frame section 12, the pivot pin 46 can also be referred to as forming a preferred embodiment of 'first bearing means fixedly secured to the frame section 10, 11, 12 and having a generally horizontal, transverse axis". The transverse axis, of course, is parallel with the axis of hinges 33, 32 shown in FIG. 1.

The wheel subassembly shown in FIG. 2 further includes rear wheel means which is comprised of a pair of wheels 47, 48, each secured for pivotal movement at the ends of a walking beam 49 which, in turn, is freely pivotal about a pivot 50 by which the beam 49 is secured to the back end (also referred to as "a back end point") of a rear suspension arm 51. The forward end of the rear suspension arm 51, in turn, is pivotably secured to the frame section 12 at a second bearing means 52 (FIGS. 3 and 4) for pivotal movement about a transverse axis.

Thus, the arm 51 can pivot in bearing 52 clockwise and counter clockwise to selectively bring the wheels 47, 48 to a different position which determines the height or elevation 53 of the frame 12 (and thus of the tips 29, 30) above or below the ground 54. The movement of the arm 51 is effected by a hydraulic cylinder 55 which is pivotably secured to the arm 51 at a pivot 56 coincident with the free end of the piston rod of the hydraulic cylinder 55. The base of the cylinder 55, in turn, is secured pivotably at pivot 57 to a transverse beam 58 which is mounted to a pair of uprights 59, 60 fixedly secured to the frame section 12. At the top of each of the upright 59, 60, a threaded stem 61, 62 is provided. A pair of sleeves, (of which only sleeve 63 is visible in FIG. 2) is welded to each end of the beam 58 and is slidably received by the respective stem 61, 62. Below and above each sleeve is a pair of adjustment nuts 64, 65 by which the respective side of the beam 58 can be raised or lowered thus raising or lowering the elevation of the pivot 57 and, in turn, of the hydraulic cylinder 55 which is eventually transmitted to the instant position of the arm 51. The adjustment of the beam 58 is important for transverse levelling of the entire frame section 10, 12, 11.

The described arrangement of the hydraulic cylinder 55 can also be referred to in general terms as a preferred embodiment of "hydraulic cylinder drive means having one end pivotaly secured to the frame section, the other end being pivotably secured to the rear suspension arm to selectively raise or lower same by pivoting it in said second bearing means".

Figure 3:
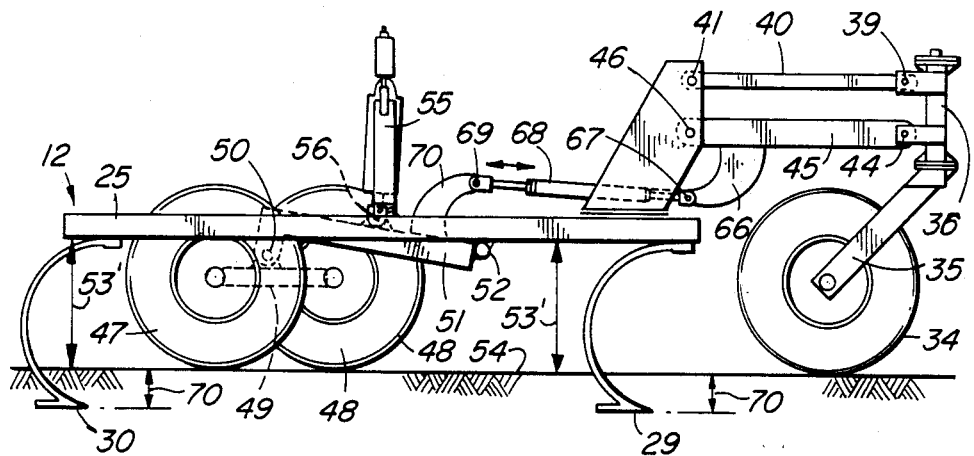
FIG. 3 is a diagrammatic side view taken from the bottom left corner of FIG. 1 and showing the geometry of the arrangement of the present invention.
Figure 4:
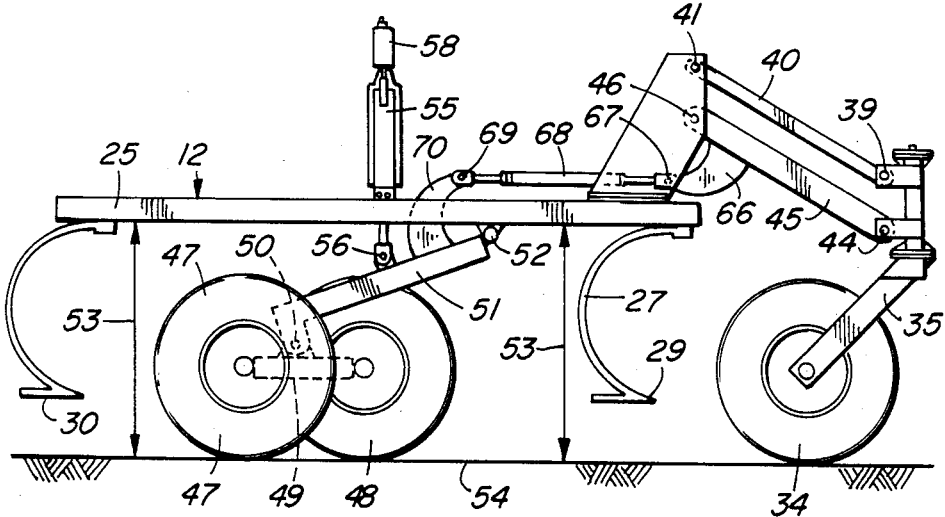
FIG. 4 is a diagrammatic side view of the implement similar to that of FIG. 3 but showing the frame of the implement in a raised position.

Turning now again to the front suspension arm 45, it is provided with an arcuately shaped bracket 66 welded to the arm 45. As best seen in the diagrammatic representations of FIGS. 3 and 4, the arcuate bracket 66 depends downwardly and rearwards from the arm 45. At a pivot 67 (also referred to as "a forward pivot joint"), a connecting rod 68 is pivotably secured to the bracket 66. The rear end of the connecting rod 68 is secured by a rear pivotal joint 69 to a rear bracket 70 which is arcuate inversely to the orientation of the bracket 66 and is fixedly secured, e.g. by welding, to the arm 51 as best seen in FIGS. 3 and 4. It will be appreciated on review of FIG. 3 or 4 that, commencing from the state of FIGURE 4, if the hydraulic cylinder 55 is contracted to produce a counter clockwise pivotal movement of the arm 51 about the second bearing means 52, eventually reaches the state of FIG. 3 in which the arm 51 slopes slightly downwardly and forwardly, as opposed to the downwardly-rearward slope of the state at FIG. 4. The arcuate movement in clockwise direction of arm 51 in FIG. 4 is transmitted by the bracket 70 and the connecting rod 68 to a counter clockwise pivoting movement of the front suspension arm 45 about the pivot pin 46.

In the shown embodiment, the angular displacement at the front suspension arm 45 is equal to the angular displacement of the trailing arm 51 as long as the arrangement which is preferred is maintained, whereby the triangles 52-50-69 and 46-44-67 are identical right-angled triangles which are inverse relative to each other. As best seen in FIG. 3, when the tips 29, 30 are at a depth of about 2 cm to 20 cm, the rear pivotal joint 69 is at a twelve-o'clock position with respect to the pivot or second bearing means 52. In other words, the pivot 69 is generally vertically above 52. Similarly, the pivot 67 is vertically below the pivot 46, i.e. in an approximately six-o'clock position. This arrangement coupled with the identity of the two triangles as referred to above presents the simplest securement of identical vertical displacement of the frame section 12 from the height 53 in FIG. 4 to the height 53 prime in FIG. 3. Once the working arrangement of FIG. 3 is achieved, the structural arrangement of the triangle as referred to above is preferably such that as long as the depth 70 of penetration of the tips 29, 30 below the ground level 54 is within approximately 2–20 cm, the mutual position of the pivots 69 and 52 stays within approximately eleven-o'clock and one-o'clock positions while that of the forward pivots 67, 46 maintains correspondingly the positions of about seven-o'clock to about five-o'clock, respectively.

The implement of the present invention is normally manufactured such that the frame section 12 maintains horizontal longitudinal position if the connecting rod 68 is extended to such a degree as to maintain the twelve-o'clock and six-o'clock positions at the rear and at the front, as referred to above. At this horizontal position all of the tips 29, 30 (and also the tips of the remaining tools not shown) are at the same depth 70. If for some reason there is a minor discrepancy, the extension of the connecting rod 68 can be provided for. As best seen from FIGS. 3 and 4, the connecting rod 68 is comprised of a central sleeve which is threaded at its ends and which is provided at each end with a threaded stem connecting the central sleeve with the respective pivots 67, 69. Once the adjustment of the connecting rod is made (preferably staying within the tolerances as referred to above), the implement is ready for use and will stay in a horizontal longitudinal arrangement at any practical level, as long as the implement moves on a horizontal ground surface.

Similarly, the manufacture of the implement is such as to maintain the entire frame section 10, 11, 12 horizontal transversely as well. Any deviations in this respect can be adjusted by manipulating the nuts 64, 65 thus raising or lowering the respective beams 58 at the desired side. Again, once the adjustment of the position of the beam is made, the implement stays horizontal transversely.

The advantage of the present design is in an extreme simplicity of the mechanism. Since the cylinders 55 are interconnected in series by way of the well known slave cylinder system, any manipulation of the hydraulic system to raise or lower the frame will result in an equal increase or decrease of the extension of each of the hydraulic cylinders 55.

The above embodiment is preferred and is believed to be the best way of carrying out the invention. This is not to say that there would not be other embodiments in which the magnitude of certain elements of the geometry of the present invention would be modified by, for instance, shortening the length of one arm and at the same time increasing its angular displacement relative to the angular displacement of the longer arm. It is not believed that such modifications are of advantage. Nevertheless, such modifications together with other changes still fall within the scope of the present invention as recited in the accompanying claims.

The embodiment of the invention in which an exclusive property or privilege is claimed are defined as follows:

1. A farming implement of the type including a frame section including a frame section carrying a plurality of earth working tools and provided with ground wheel means secured to the frame section for allowing movement thereof in a predetermined direction; towing bar means secured to said frame section at a front end therof for free pivotal movement about a generally horizontal, transverse axis, said ground wheel means including a plurality of ground wheel subassemblies, each ground wheel subassembly comprising, in combination:

(a) front wheel means at the front of the frame section, said front wheel means being connected with a forward end of a longitudinal front suspension arm at a forward end point thereof, the rear end of the front suspension arm being pivotable about a first pivot point formed by first bearing means fixedly secured to the frame section and having a generally horizontal, transverse axis;

(b) rear wheel means connected with a longitudinal rear suspension swing arm at a mounting point located at a first free end thereof, the second end of the swing arm being pivotable about a generally horizontal transverse axis in second bearing means fixedly secured to the frame section;

(c) hydraulic cylinder drive means having one end pivotably connected with the frame section, the other end being pivotably connected with the swing arm at a point on the swing arm disposed between the free end and said second bearing means, to selectively raise or lower same by pivoting it in said second bearing means;

(d) a front bracket fixedly secured to the front suspension arm and extending rearwards thereform and having, at a free end thereof, a forward pivot joint pivotably connected to connecting rod, said forward pivot joint being disposed at a level spaced vertically from the level of said generally horizontal transverse axis of the first bearing means;

(e) a rear bracket fixedly arranged on the swing arm and extending upwardly and forwards therefrom to form at a free end thereof a rear pivotal joint pivotably connected to the connecting rod, said rear pivotal joint being disposed at a level above that of the second bearing means, said second bearing means, said mounting point and said rear pivotal joint defining a first right-angled triangle which is similar to a second right-angled triangle defined by said first bearing means, the forward end point and the forward pivot joint;

(f) the connecting rod having a rear end pivotably conected with the rear pivotal joint and a front end pivtably connected with the forard pivot joint for transmitting the pivotal movement of the swing arm to the front suspension arm such that the lowering of the back end of the swing arm results in the lowering of the forward end of the front suspension arm relative to the frame and vice-versa.

2. A farming implement as recited in claim 1, wherein said triangles are identical triangles.

3. A farming implement as defined in claim 2, wherein the rear pivotal joint is between approximately an eleven-o'clock position and a one-o'clock position relative to the second bearing means, while the forward pivot joint is between approximately a seven o'clock position and a five-o'clock position, respectively, relative to the first bearing means, when the frame section is in a lowered state with the earth working tools in operating position.

* * * * *